O. M. GRAVES.
CEREAL FORMER AND TOASTER.
APPLICATION FILED JUNE 13, 1913.
1,138,747.
Patented May 11, 1915.
2 SHEETS—SHEET 1.
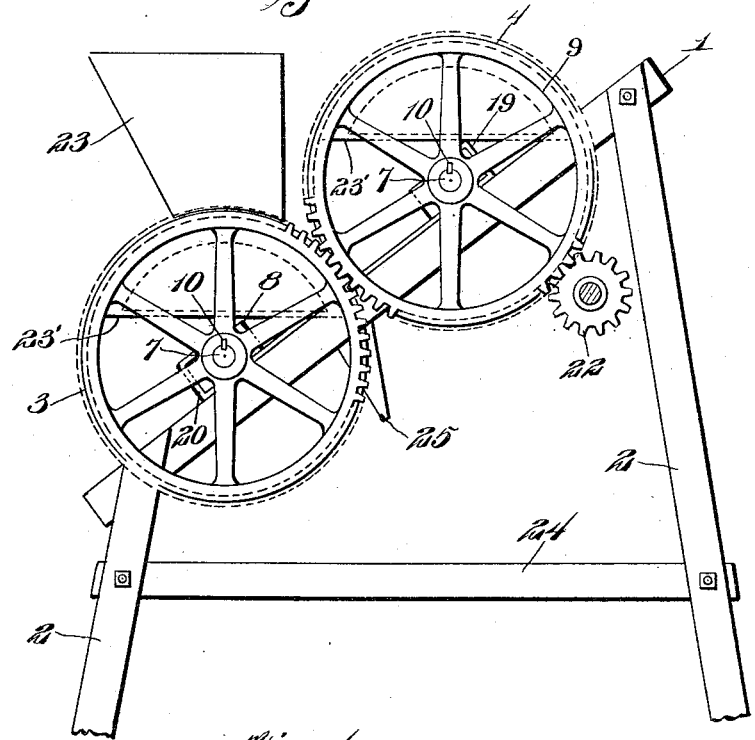
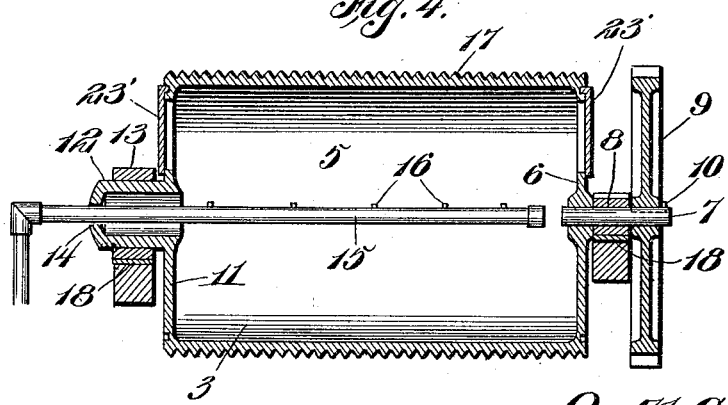
Witnesses
Louis R. Heinrichs
D. W. Gould
Inventor
O. M. Graves
By Victor J. Evans
Attorney O. M. GRAVES.
CEREAL FORMER AND TOASTER.
APPLICATION FILED JUNE 13, 1913.
1,138,747.
Patented May 11, 1915.
2 SHEETS—SHEET 2.
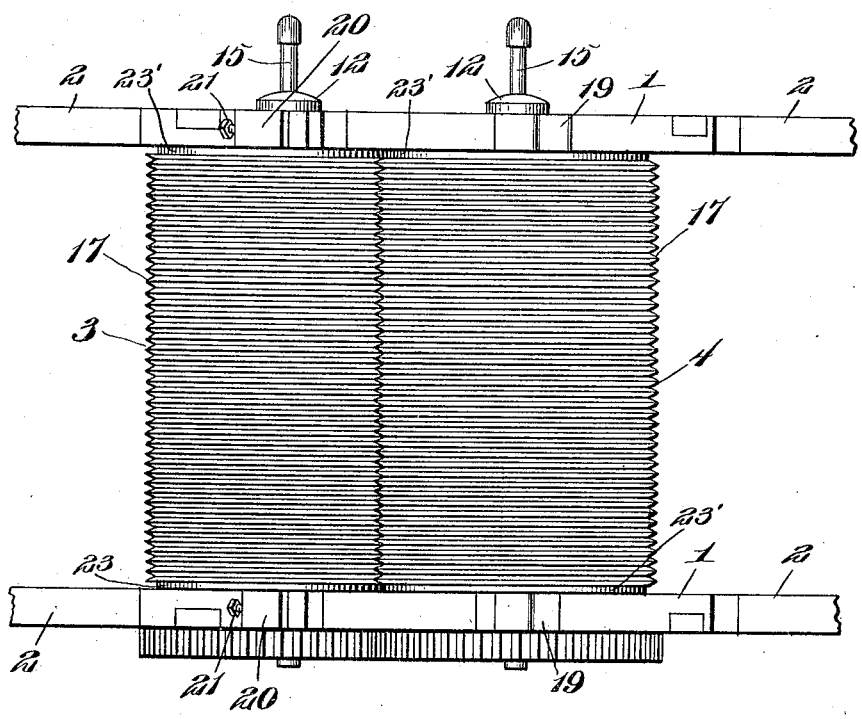
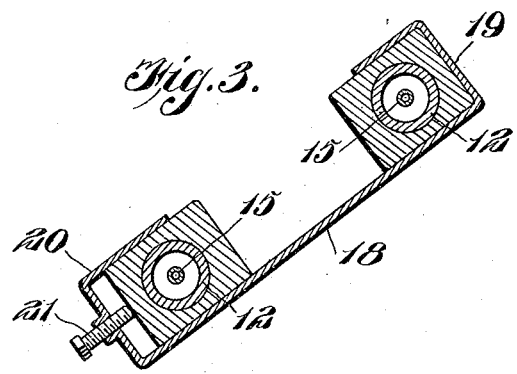
Witnesses
Louis R. Heinrichs
D. W. Gould
Inventor
O. M. Graves
By Victor J. Evans
Attorney

UNITED STATES PATENT OFFICE.

ORIEL M. GRAVES, OF ODESSA, WASHINGTON, ASSIGNOR TO WESTERN CEREAL COMPANY, A CORPORATION.

CEREAL FORMER AND TOASTER.

1,138,747.  Specification of Letters Patent.  Patented May 11, 1915.

Application filed June 13, 1913. Serial No. 773,576.

*To all whom it may concern:*

Be it known that I, ORIEL M. GRAVES, a citizen of the United States, residing at Odessa, in the county of Lincoln and State of Washington, have invented new and useful Improvements in Cereal Formers and Toasters, of which the following is a specification.

The invention relates to an improved cereal former and toaster, in the use of which cereals in a softened or partially cooked state are treated with the effect to complete the cooking and form the cereal grains into cream, flake or sheet form.

The main object of the present invention is the provision of a combined cereal former and toaster including forming rolls of hollow construction, between which the cereal grains in softened or partially cooked state are introduced, the rolls being heated to a degree sufficient to toast or complete the cooking of the grains.

The invention in its preferred form of details will be described in the following specification, reference being had particularly to the accompanying drawings, in which:—

Figure 1 is a view in side elevation of the improved machine. Fig. 2 is a plan of the same. Fig. 3 is a longitudinal section. Fig. 4 is a longitudinal section through one of the rolls.

Referring particularly to the accompanying drawings, the improved machine comprises a skeleton supporting frame 1 mounted upon legs 2 and arranged to be held at a decided angle to the horizontal as clearly shown in Fig. 1 of the drawings. Mounted upon the frame are the toasting and crimping rolls 3 and 4, the latter being held in fixed relation to the frame except for its rotative movement and the former being adjustable, as will presently appear. The rolls, aside from the means whereby their adjustment is provided, are of identical construction, each including hollow cylindrical drums 5 one end wall 6 of which is formed with an opening to receive a relatively fixed stub shaft 7 adapted to be supported in the bearing block 8, and beyond the block to receive a gear 9 secured thereon through the medium of a key 10. The opposite end wall 11 of the drum is formed to provide a hollow trunnion 12 adapted to be mounted in a bearing block 13, the end wall of the trunnion being formed with an opening 14 to permit passage therethrough with the gas or other fuel pipe 15 which within the drum is provided with outlets or burners 16 to provide for the ignition of the gas and consequent heating of the drum. The cylindrical surface of the drum is corrugated or otherwise formed at 17, the irregular or regular corrugations or projections formed on the respective drums, serving as a means for imparting the desired formation to the cereal grains. Bearing strips 18 are secured upon the bed frame 1 having U-shaped terminals 19 and 20. Bearing blocks 8 and 13 of the drum 4 are fixed in the terminals 19 of the respective bearing strips, while the bearings 8 and 13 of the drum 3 are slidably mounted in the terminals 20 of the bearing strips 18, and adjustable longitudinally of said bearing strips through the medium of screw rods 21 connected to the bearing blocks and threaded through an appropriate portion of the bearing strip.

The respective gears 9 of the rolls intermesh and one of them, preferably that carried by the roll 3, meshes with the pinion 22 to which power is communicated from any suitable source whereby the rolls are simultaneously driven in opposite directions. It is of course to be understood that the teeth of the respective gears 9 are of such length as to permit the necessary adjustments of the rolls to space their corrugated surface a requisite distance apart without destroying the driving coöperation of said gear.

A hopper 23 is positioned above the rolls slightly to one side of their meeting line, said hopper being supported on the frame and being designed to receive partially cooked or treated grains in bulk.

The ends of the drums may be of skeleton form and the end walls made up of semicircular sections 23 which may be adjusted relative to each other to provide desired air admission to the interior of the drums to regulate the heat thereof.

The cereal grains are fed into the hopper in bulk after being softened or if desired, partially cooked. The drums heated to the desired degree are rotated and the grains from the hopper gravitate between the drums, being in such travel subjected to the pressing influence of the corrugations of the drum and at the same time projected through the influence of the heat. By this means the grains are delivered below the rolls in crimped flakes or sheets and in toasted or completely cooked condition.

If desired, a supporting frame 24 may be connected to the legs 2 to support a receptacle into which the grains may be delivered, and the frame 1 may be provided on its lower side with a chute including walls 25 to insure proper delivery of the finished product to the receiver.

The improved structure will make and produce cereal products in sheet form ready for the table.

What is claimed is:—

A combined cereal crimping and cooking machine including a frame having an inclined upper surface, bearing strips secured upon said surface, an adjustable and a nonadjustable bearing block mounted in each of the strips, rolls mounted in said bearing blocks, said rolls having their peripheries formed with a series of ribs that intermesh with each other, one of said rolls being adjustably mounted so as to vary the distance between said ribs, burners supported by said rolls for heating the latter, and a hopper arranged above said rolls.

In testimony whereof I affix my signature in presence of two witnesses.

ORIEL M. GRAVES.

Witnesses:
W. H. MERRITT,
J. A. BRETZ.

Copies of this patent may be obtained for five cents each, by addressing the "Commissioner of Patents, Washington, D. C."